April 14, 1970  S. N. ROSENTHAL  3,506,860
TRACTION MOTOR INSPECTION COVER
Filed July 8, 1968  2 Sheets-Sheet 1
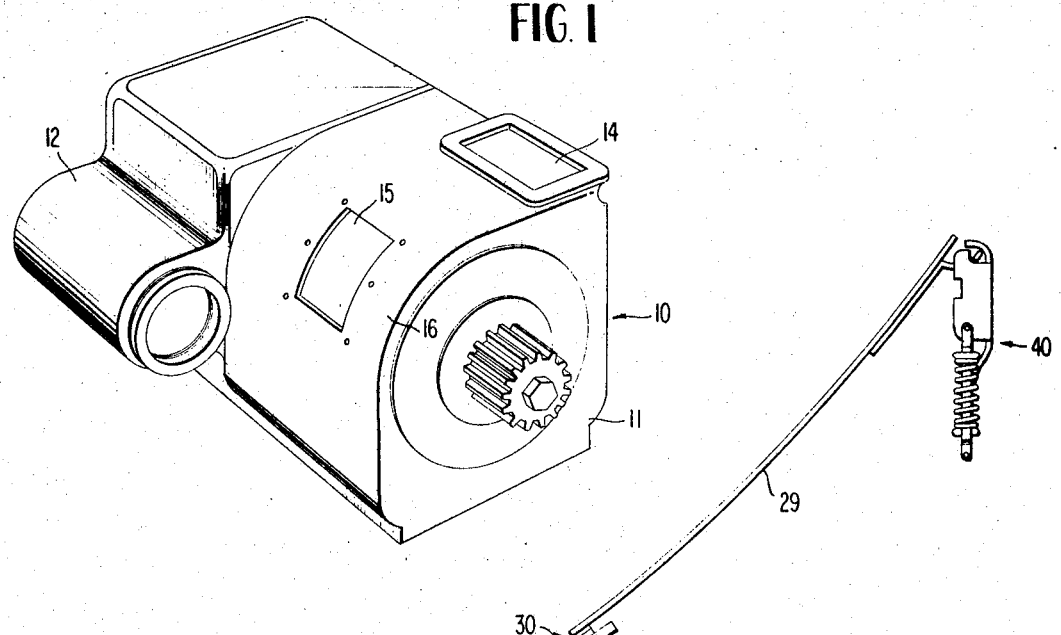
FIG. 1
FIG. 3
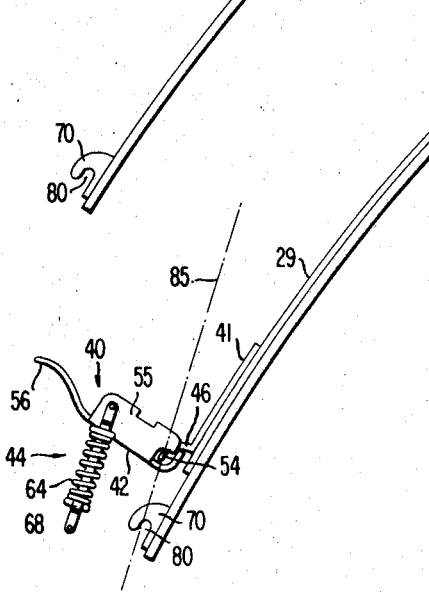
FIG. 4
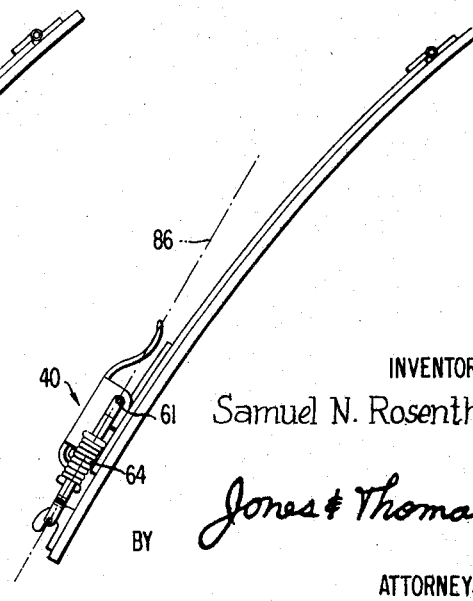
FIG. 5
INVENTOR
Samuel N. Rosenthal
Jones & Thomas
BY
ATTORNEYS

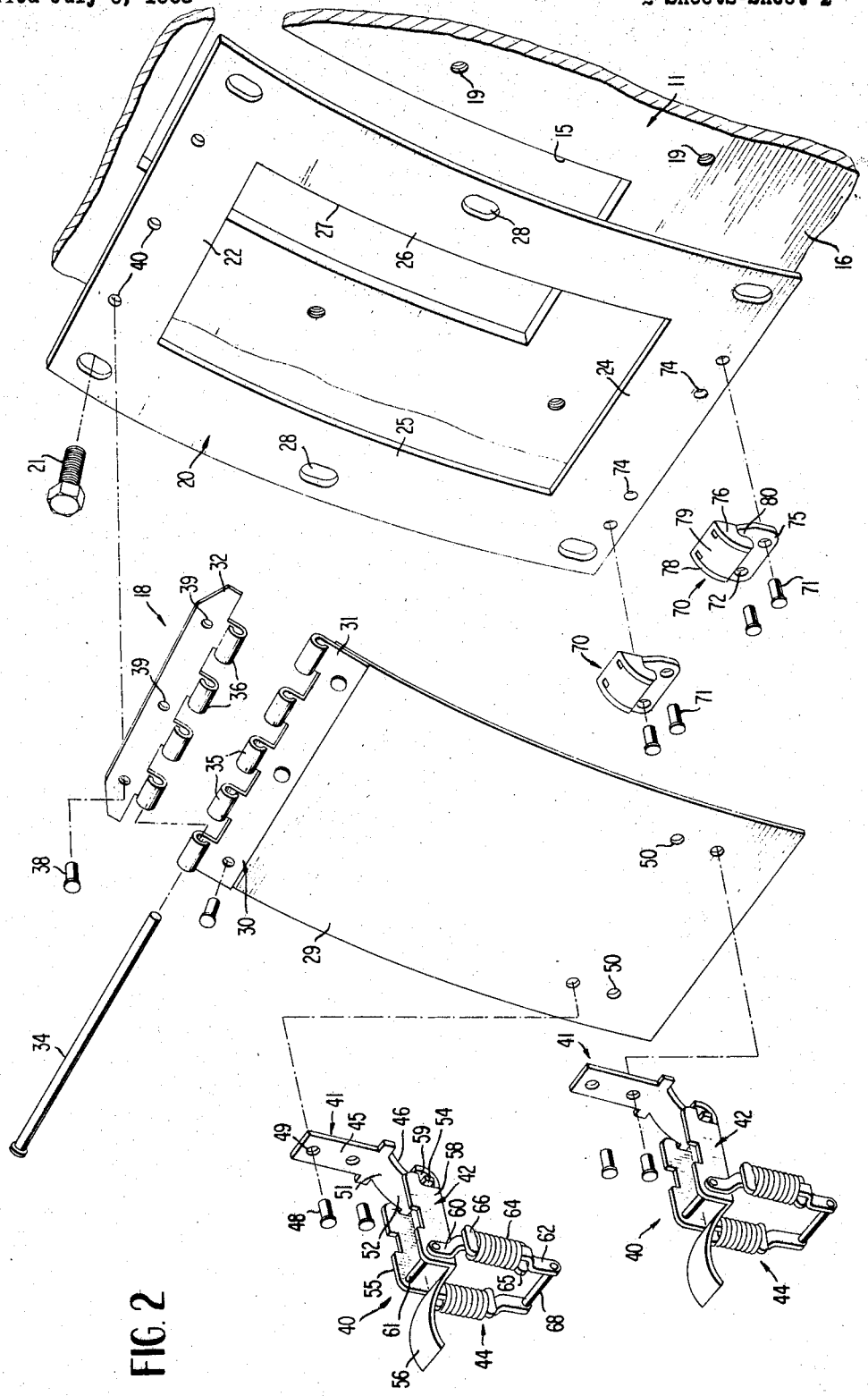

United States Patent Office 3,506,860
Patented Apr. 14, 1970

3,506,860
TRACTION MOTOR INSPECTION COVER
Samuel Nathan Rosenthal, 2638 Midway Road,
Decatur, Ga. 30030
Filed July 8, 1968, Ser. No. 743,254
Int. Cl. H02k 5/04
U.S. Cl. 310—49            4 Claims

ABSTRACT OF THE DISCLOSURE

An inspection door assembly for a diesel-electric traction motor housing, including a generally rectangular frame defining a central opening. The frame is curved from top to bottom about an axis extending parallel to the top and bottom legs, and a plurality of bolt openings are defined at spaced intervals about the frame for connecting the frame to the traction motor housing. A door sized to span the opening of the frame and overlap portions of the frame top, bottom and side legs is hingedly connected to the top leg of the frame. A pair of spaced latch mechanisms are connected to the door at its edge adjacent the bottom leg of the frame which are connectable to the bottom leg, and the latch mechanisms each comprise springs connectable to the bottom leg which together are of a strength sufficient to bend the door into abutting relationship with the side legs and the bottom leg so that the door assumes the curvature of the frame.

BACKGROUND OF THE INVENTION

Traction motors for diesel-electric railway engines are located at the lower portion of the engine frame, between the driving wheels of the engine. The position of the traction motors is such that they are difficult to inspect, test and mainain, and the engine components and its housing must be fabricated of durable material to withstand the vibrations and forces normally encountered by the engines. Traction motors are highly expensive, and when one of the traction motors of a diesel-electric engine must be repaired, the traction motor is usually removed from the engine, which necessitates motor replacement and prolonged down time for the diesel-electric engine.

In order to avoid repair of traction motors, elaborate preventive maintenance procedures have been developed to detect and rectify motor troubles before the minor troubles develop into major problems. Since the commutator and its brushes are among the most vital and vulnerable parts of a traction motor, an inspection opening is provided in the housing of the traction motor that enables the maintenance man to inspect and test the commutator and brushes. The inspection opening is located in a curved portion of the housing which is curved at an arc generally concentric with the axis of the commutator to afford the maintenance man ready access to the parts to be inspected. An inspection plate or cover is connected to the housing over the inspection opening to prevent debris from flying into the inspection opening and into the traction motor housing. The inspection plate is normally securely bolted onto the housing with a plurality of bolts since the inspection plate must be strong enough to withstand the vibrations and abrasions which might be encountered by the traction motor housing. Thus, when the maintenance crew inspects the traction motor, all the bolts of the inspection plate cover must be completely removed before access can be had to the commutator and brushes, the inspection plate and its bolts must not be misplaced or lost during the inspection, and when the inspection has been completed, the maintenance crew must relocate the inspection plate over the inspection opening and thread the bolts through the inspection plate and into the motor housing.

Thus, the inspection of the commutator and brushes of a traction motor requires considerable effort and an extended amount of time on behalf of the maintenance crew. The requirement of the extra time and effort causes the maintenance crew to be reluctant to remove the inspection plate, to leave the inspection plate off the motor housing under some conditions when it is desirable to have the inspection plate replaced on the housing, to temporarily place the inspection plate on the motor housing by inserting only a few of the bolts through the inspection plate, or loosely threading the bolts through the inspection plate. Of course, these situations are undesirable since accidental damage to the commutator and its brushes may take place, or the preventive maintenance program may not be adequately carried out.

SUMMARY OF THE INVENTION

Briefly described, the present invention comprises a traction motor inspection cover connectable to the housing of a traction motor about its inspection opening which is easy to open and close, and which is not detachable from the traction motor housing. The construction of the inspection cover is such that it can be securely positioned over the inspection opening without danger of inadvertent opening or removal thereof, and when the inspection cover is opened to gain access to the commutator and brushes, it is moved to a position where it will not interfere with the inspection, maintenance or repair procedures. If the inspection cover is placed over the inpection opening without securely fastening the cover to the housing, the connecting mechanisms protrude at an angle from the cover so that it will be apparent by merely observing the cover that the cover is not securely connected.

Thus, it is an object of this invention to provide a traction motor inspection cover for a diesel-electric railway engine which allows rapid and expedient access to the commutator and brushes of the motor.

Another object of this invention is to provide a traction motor inspection cover which can be moved between a securely closed position to an opened positon with a minimum of effort and attention, and which can be detected to be rigidly fastened to or not fastened to the traction motor housing by observation.

Another object of this invention is to provide an inspection cover for a traction motor which is economical to manufacture, durable, expedient in use, and which streamlines the inspection, preventive maintenance and repair procedures of a traction motor.

Other objects, features an advantages of the present invention will become apparent upon reading the following specification, when taken in conjunction with the accompanying drawing.

BRIEF DESCRIPTION OF THE DRAWING

FIGURE 1 is a perspective view of a traction motor of a diesel-electric railway engine.

FIGURE 2 is an exploded perspective view of the traction motor inspection cover.

FIGURE 3 is a side elevational view of the inspection cover, with the door of the cover shown in its fully opened position.

FIGURE 4 is a side elevational view of the inspection cover, similar to FIGURE 3, but showing the door in its closed and unlatched condition.

FIGURE 5 is a side elevational view, similar to FIGURES 3 and 4, but showing the door in its closed and latched condition.

DESCRIPTION OF THE PREFERRED EMBODIMENTS

Referring now more particularly to the drawing, in which like numerals indicate like parts throughout the several views, FIGURE 1 shows traction motor 10 which comprises housing 11 and includes motor axle bearing 12, blower duct 14, and inspection opening 15. Inspection opening 15 is located in curved portion 16 of housing 11 which is curved on a radius projecting from the center of the motor commutator (not shown), so that the surface of housing portion 16 is spaced immediately outwardly of the commutator and brushes of traction motor 10. Thus, a workman can gain immediate access to the commutator and its brushes through inspection opening 15.

As is shown in FIGURE 2, inspection cover 18 is provided for covering inspection opening 15. A plurality of spaced threaded bolt openings 19 are provided in curved portion 16 of housing 11 about inspection opening 15, and frame 20 of inspection cover 18 is connected to housing 11 by means of bolts 21. Frame 20 comprises upper support leg 22, lower support leg 24, and side support legs 25 and 26 all of which are integrally connected to one another. A plurality of elongated bolt openings 28 are defined at spaced intervals in support legs 22–26, and bolt openings 28 are alignable with internally threaded openings 19 of housing 11. Thus, frame 20 is connectable to curved portion 16 of housing 11 by threading bolts 21 through bolt openings 28 and 19.

Door 29 is connected to upper support leg 22 by means of hinge 30. Hinge 30 comprises hinge plates 31 and 32 and hinge pin 34 inserted through hinge bosses 35 and 36. Hinge pin 34 is blunted at its ends after insertion through bosses 35 and 36, to inhibit its removal. Hinge plate 32 is connected to upper support leg 22 by welding or by inserting brads 38 through apertures 39 in hinge plate 32 and apertures 40 in frame 20, or both. Hinge plate 31 is connected to door 29 in a similar manner.

Door 29 is curved from its top edge to its bottom edge at a radius generally similar to the radius of curvature of frame 20. Door 29 is of a length and width sufficient to span opening 27 of frame 20, and to overlap side support legs 25 and 26 and lower support leg 24. Hinge 30 is constructed so that door 29 rests in abutting relationship with support legs 24–26.

A pair of latch mechanisms 40 are connected to door 29 adjacent the lower edge of the door. Latch mechanisms 40 each comprise support element 41, lever 42, and catch 44. Support element 41 includes support plate 45 and hinge plate 46. Support plate 45 is connectable to door 29 by means of welding or brads 48 inserted through holes 49 and 50 of support plate 45 and door 29 respectively. Hinge plate 46 is L-shaped and includes leg 51 which extends out away from door 29, and leg 52 which extends generally parallel to door 29 and toward lower support leg 24 of frame 20. Leg 52 terminates in outwardly extending hinge tabs 54 which project outwardly on either side of leg 52.

Lever 42 of latch mechanism 40 includes concave housing 55 and handle 56. Concave housing 55 includes side walls 58 which define hinge tab openings 59. Hinge tab openings 59 are inserted over hinge tabs 54, to create a pivotal or hinged relationship between lever 42 and support element 41.

Catch 44 is connected to lever 42 intermediate its ends, and includes a pair of spring support arms 60 positioned on opposite sides of concave housing 55 and connected to each other by means of connecting pin 61. Connecting pin 61 extends through side walls 58. A pair of spring compressing arms 62 are placed in overlapping relationship with spring support arms 60, and coiled compression springs 64 surround the overlapping spring compressing arms and spring support arms. Spring support arms 60 and spring compressing arms 62 each terminate in spring retaining tabs 65 and 66, respectievly. Latching bar 68 is connected at its ends to the ends of spring compressing arms 62.

A pair of keepers 70 are connected to the lower support leg 24 of frame 20 by welding or with the use of brads 71 inserted through aligned holes 72 and 74 of keepers 70 and frame 20. Keepers 70 are each fabricated of a single piece of metal and include base plate 75, side hooks 76 and 78, and hook plate 79 which define slot 80. Keepers 70 are placed on frame 20 so that latching bars 68 of latching mechanisms 40 can be inserted into slots 80.

OPERATION

Traction motor cover 18 is connected to the curved portion 16 of housing 11 of traction motor 10 by inserting bolts 21 through the elongated openings 28 of frame 20 and threading the bolts into threaded apertures 19 in housing 11. Frame 20 is fabricated of metal of a thickness which imparts enough rigidity to the cover to withstand the vibrations and abrasions that might be encountered by traction motor 10; however, frame 20 is flexible enough so that when bolts 21 are tightened, frame 20 will flex to conform to the curvature of the curved portion 16 of housing 11. Elongated openings 28 permit frame 20 to flex the amount necessary to conform to the curvature of housing 11, without binding between adjacent ones of bolts 21.

When frame 20 has been attached to housing 11 in this manner, door 29 is pivotal between the positions shown in FIGURES 3 and 4, to open or close inspection opening 15 of housing 11. Door 29 can be pivoted about hinge 30 to a position where its center of gravity passes hinge pin 34, as is shown in FIGURE 3, so that door 29 tends to remain in its fully opened position. When in its position, door 29 will be positioned generally adjacent the portion of housing 11 above inspection opening 15, so that it is displaced out of the way of the workmen inspecting traction motor 10.

When door 29 is pivoted about hinge 30 to its closed position, as is shown in FIGURE 4, it will normally rest in abutting relationship with frame 20, and cover frame opening 27. Latch mechanism 40 will protrude outwardly away from door 29 to warn the operator that door 29 is not securely connected to frame 20. As is shown in FIGURE 4, concave housing 55 of lever 42 engages hinge plate 46 of support element 41 so that lever 42 extends generally normal to door 29. Latch 44 is loosely connected to lever 42, and droops in a downward direction.

When it is desired to positively connect door 29 to frame 20, latches 44 are pivoted toward frame 20 until latching bars 68 are moved into slots 80 of keepers 70, and the operator engages handles 56 of levers 42 and pivots levers 42 in a clockwise direction about hinge tabs 54 of support elements 41. As levers 42 move in this direction, spring support arms 60 and spring compression arms 62 move with respect to each other, and their retaining tabs 65 and 66 compress springs 64. Since hinge tabs 54 of support elements 41 are displaced outwardly from door 29, spring support arms 60 and spring compression arms 62 will pass the line of projection 85 which extends between hinge tabs 54 and slots 80 of support elements 41 and keepers 70, and assume the line of projection 86 between slots 80 and connecting pin 61, as is shown in FIGURES 4 and 5. Thus, compressed springs 64 tend to maintain latch mechanisms 40 in a closed condition.

As is shown in FIGURE 5, latch mechanisms 40 lie flat against door 29 when door 29 is securely latched to frame 20. Thus, latch mechanisms 40 will not project outwardly from traction motor housing 11 a distance where they would form a cumbersome protrusion and be in the way of other activities which must be carried out in the close quarters about traction motor 10.

Springs 64 are chosen so that their accumulated biasing forces in their compressed state when latch mechanisms 40 are connected are sufficient to stretch and bend door 29 about frame 20, so that door 29 substantially conforms to the curvature of frame 20. While door 29 is originally fabricated with a radius of curvature approximately equal to that of frame 20, frame 20 may assume a slightly different curvature when attached to traction motor housing 11, or frame 20 and door 29 may be inadvertently fabricated with different radii of curvature. Door 29 is fabricated of thinner material than frame 20 in order to enable door 29 to bend, as desired; however, since door 29 is supported by hinge 30 at its upper edge, and by side support legs 25 and 26 along its side edges, and by lower support leg 24 along its bottom edge, it derives some strength characteristics from frame 20 when it is latched and the reduced thickness of door 29 will not function to weaken the structure of traction motor inspection cover 18.

Since door 29 is stretched and bent into positively contact with frame 20, door 29 will be virtually sealed to frame 20 when in its latched closed position. Thus, the hazard of debris entering inspection opening 15 of traction motor housing 11 is substantially eliminated.

It will be obvious to those skilled in the art that many variations may be made in the embodiments chosen for the purpose of illustrating the present invention without deparing from the scope thereof as defined by the appended claims.

I claim:

1. A traction motor of a diesel-electric railway engine including a housing which defines a commutator inspection opening, the combination therewith of a door assembly positioned over said inspection opening which comprises a generally rectangular frame defining a central opening and including top and bottom support legs and side support legs, said frame being curved through its top support leg along its side support legs and through its bottom support leg about an axis extending parallel to said top and bottom support legs, a plurality of bolt openings being defined at spaced intervals about said frame for connecting said frame to said housing, a door of a length and width sufficient to span the opening of said frame and overlap portions of said top, bottom and side support legs and being hingedly connected to the top support leg, said door being of a curvature generally similar to the curvature of said frame, a pair of spaced latch mechanisms connected to said door at its edge which is movable into overlapping relationship with said bottom support leg of the frame, a pair of spaced keeper members connected to said bottom support leg of the frame for engagement with said latch mechanisms, said latch mechanisms each comprising spring means connectable to said keeper members which together are of a strength sufficient to bend said door whereby the edge portions of said door are placed in abutting relationship with said bottom and side support legs and the door assumes the curvature of said frame.

2. The invention of claim 1 wherein said latch mechanisms each comprise a lever hingedly connected at one of its ends to said door at its edge which is movable into overlapping relationship with said bottom support leg of the frame, said levers each being pivotable about said door from a position extending away from said door and into generally parallel abutting relationship with said door, a pair of spring support legs each pivotally supported at one of their ends to opposite sides of and intermediate the ends of each of said levers and including spring retaining tabs at their other ends, a pair of spring compressing legs each including spring retaining tabs at one of their ends in overlapping relationship with said support legs and connected at their other ends to a common latching bar, a coiled compression spring surrounding each spring support leg and its spring compressing leg between the spring retaining tabs of said legs, said springs of both latch mechanisms being of combined strength characteristics sufficient to bend said door into a curvature corresponding to the curvature of said frame when said latching bars are engaged with said keepers and said levers are moved into abutting relationship with said door.

3. The invention of claim 1 wherein said door and said frame include a hinge structure which allows the door to be rotated about said hinge structure beyond a vertically extending attitude whereby said door remains in a balanced opened position.

4. A traction motor of a diesel-electric railway engine including a housing which defines a commutator inspection opening, the combination therewith of a door assembly positioned over said inspection opening which comprises a generally rectangular frame attached to said housing about said opening and defining a central opening, said frame being curved along its length about an axis extending generally parallel to its top and bottom edges, a door of a length and width sufficient to span the opening of said frame, hinge means connecting together the top of said door and the top of said frame for pivoting said door about a horizontal axis from a first position on one side of said hinge means where the weight of the door urges said door to its closed position to a second position on the other side of said hinge means where the weight of said door tends to maintain said door in its opened position, said door being a curvature generally similar to the curvature of said frame, at least one latch mechanism connected to said door at its lower edge, and at least one keeper member connected to the bottom of said frame for engagement with said latch mechanism, said latch mechanism comprising spring means connectable to said keeper member for biasing said door toward its closed position.

References Cited

UNITED STATES PATENTS

| 596,135 | 12/1897 | Bassett | 310—89 |
| 672,952 | 4/1901 | Merrick | 310—255 |
| 878,167 | 2/1908 | Webster | 310—89 |

FOREIGN PATENTS

| 1,036,994 | 8/1958 | Germany. |

WARREN E. RAY, Primary Examiner

U.S. Cl. X.R.

310—156, 184; 318—138